US011015499B2

(12) United States Patent
Rau

(10) Patent No.: US 11,015,499 B2
(45) Date of Patent: May 25, 2021

(54) OIL SEPARATOR FOR SEPARATING OIL FROM AEROSOL IN A COMBUSTION ENGINE

(71) Applicant: Bayerische Motoren Werke Aktiengesellschaft, Munich (DE)

(72) Inventor: Tobias Rau, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/188,742

(22) Filed: Nov. 13, 2018

(65) Prior Publication Data

US 2019/0078475 A1 Mar. 14, 2019

Related U.S. Application Data

(63) Continuation of application No. PCT/EP2017/056802, filed on Mar. 22, 2017.

(30) Foreign Application Priority Data

May 13, 2016 (DE) ..................... 10 2016 208 248.5

(51) Int. Cl.
 *F01L 3/08* (2006.01)
 *F01L 1/46* (2006.01)
 (Continued)

(52) U.S. Cl.
 CPC .............. *F01M 13/04* (2013.01); *F01L 1/46* (2013.01); *F01M 13/021* (2013.01); *B01D 45/08* (2013.01);
 (Continued)

(58) Field of Classification Search
 CPC ........... F01M 13/04; F01M 2013/0422; F01M 2013/0433
 See application file for complete search history.

(56) References Cited

U.S. PATENT DOCUMENTS 5,063,882 A * 11/1991 Koch ..................... F01M 13/04
 123/41.86
5,542,402 A 8/1996 Lee et al.
 (Continued)

FOREIGN PATENT DOCUMENTS

CN 101137821 A 3/2008
CN 203308546 U 11/2013
 (Continued)

OTHER PUBLICATIONS

International Search Report (PCT/ISA/210) issued in PCT Application No. PCT/EP2017/056802 dated Jul. 12, 2017 with English translation (seven pages).
 (Continued)

*Primary Examiner* — Long T Tran
(74) *Attorney, Agent, or Firm* — Crowell & Moring LLP

(57) ABSTRACT

An oil separator separates oil from aerosol in a combustion engine. The oil separator includes a housing having an inlet opening for the aerosol, an impeller which can be rotatably driven about a rotational axis, and which is adapted for generating an aerosol flow along an axial direction of the impeller and arranged in the housing, and an impact wall which is designed in such a way that a projection of the impeller oriented axially and downstream in the air flow impinges on the impact wall. At least one part of a projection of the impeller oriented axially and downstream in the air flow impinges on the inlet opening.

9 Claims, 3 Drawing Sheets

(51) Int. Cl.
 *F01M 13/04* (2006.01)
 *F01M 13/02* (2006.01)
 *B01D 45/08* (2006.01)

(52) U.S. Cl.
 CPC .... *F01L 2810/02* (2013.01); *F01M 2013/026* (2013.01); *F01M 2013/0422* (2013.01); *F01M 2013/0433* (2013.01)

(56) References Cited

U.S. PATENT DOCUMENTS

| | | | | |
|---|---|---|---|---|
| 7,699,029 | B2* | 4/2010 | Herman | .......... F01M 13/04 123/41.86 |
| 9,624,821 | B2* | 4/2017 | Igarashi | .......... F02M 35/10222 |
| 2009/0038568 | A1 | 2/2009 | Kira | |
| 2010/0126441 | A1* | 5/2010 | Hornung | .......... F01M 13/00 123/41.86 |
| 2010/0126480 | A1 | 5/2010 | Shieh | |
| 2010/0294218 | A1* | 11/2010 | Ruppel | .......... F01M 13/021 123/41.86 |

FOREIGN PATENT DOCUMENTS

| | | |
|---|---|---|
| DE | 101 40 301 A1 | 2/2003 |
| DE | 10 2004 045 630 A1 | 4/2006 |
| DE | 10 2010 015 838 A1 | 10/2011 |
| DE | 102010015838 A1 * | 10/2011 .......... B01D 45/14 |
| EP | 1 857 644 A1 | 11/2007 |
| JP | 57-5905 U | 1/1982 |
| JP | 63-87211 U | 6/1988 |
| JP | 4-234512 A | 8/1992 |
| JP | 2004-301056 A | 10/2004 |
| JP | 2009-121341 A | 6/2009 |

OTHER PUBLICATIONS

German-language Written Opinion (PCT/ISA/237) issued in PCT Application No. PCT/EP2017/056802 dated Jul. 12, 2017 (five pages).

German-language Office Action issued in counterpart German Application No. 10 2016 208 248.5 dated Feb. 22, 2017 (six pages).

Chinese-language Office Action issued in Chinese Application No. 201780029476.X dated Apr. 1, 2020 with English translation (15 pages).

Chinese language Office Action issued in Chinese Application No. 201780029476.X dated Feb. 19, 2021 with English translation (12 pages).

* cited by examiner

OIL SEPARATOR FOR SEPARATING OIL FROM AEROSOL IN A COMBUSTION ENGINE

CROSS REFERENCE TO RELATED APPLICATIONS

This application is a continuation of PCT International Application No. PCT/EP2017/056802, filed Mar. 22, 2017, which claims priority under 35 U.S.C. § 119 from German Patent Application No. 10 2016 208 248.5, filed May 13, 2016, the entire disclosures of which are herein expressly incorporated by reference.

BACKGROUND AND SUMMARY OF THE INVENTION

The invention relates to an oil separator for separating oil from aerosol in an internal combustion engine, an internal combustion engine having an oil separator of this kind, and a motor vehicle having an internal combustion engine of this kind.

During the running of internal combustion engines, it is unavoidable that so-called blow-by gases will escape from the combustion chambers into the crankcase of the internal combustion engine through small leaks at the piston ring gaps. These blow-by gases are usually recirculated to subsequent combustion cycles of the internal combustion engine. After the crankcase has been flowed through, oil located in said crankcase is taken up by the blow-by gases. If this aerosol (blow-by gases with oil) is fed back to the combustion chamber, it can lead to carbonization of the intake valves, pistons and combustion chambers during prolonged running. The oil must therefore be separated from the aerosol as completely as possible before the blow-by gases are recirculated to the combustion chambers. Oil separators for this purpose are known from the state of the art.

The problem addressed by the invention is that of providing an even more efficient oil separator. This problem is solved by an oil separator according to embodiments of the invention.

According to an exemplary embodiment of the invention, an oil separator is provided for separating oil from aerosol in an internal combustion engine. The oil separator has a housing exhibiting an intake opening for the aerosol, a drivable impeller rotating about a rotational axis, which impeller is adapted to generate an aerosol flow along an axial direction, i.e. parallel to the rotational axis, of the impeller, and is arranged in the housing, and an impact wall which is configured in such a manner that a projection of the impeller directed axially, i.e. parallel to the rotational axis of the impeller, and downstream in the air flow impinges on the impact wall. At least part of a projection of the impeller directed axially and upstream in the air flow impinges on the intake opening. Through the straight-line acceleration of the aerosol, which is achieved by the intake opening being arranged in a straight line in the axial extension of the impeller, and also the straight-line onward transportation to the impact wall, the aerosol particles impinge on the impact wall at high speed. This high speed produces good separation of the oil, i.e. essentially a separation into blow-by gas and oil. Due to the gravity at the impact wall, the separated oil can flow downwards and be transported back into the crankcase, whereas the remaining blow-by gases can escape via an air outlet opening positioned as high as possible (i.e. against gravity) and be guided back to the combustion chambers. The use of an axial impeller also means that the design of the oil separator is less complex than other state-of-the-art oil separators.

According to a further exemplary embodiment of the invention, the housing has at least one air outlet opening that is located further outwards radially than the impeller.

According to a further exemplary embodiment of the invention, the air outlet opening is arranged in a planned installation position of the oil separator in a weight-force-averted half of the housing.

According to a further exemplary embodiment of the invention, a dividing wall is configured radially within the air outlet opening, so that a gap is formed between the air outlet opening and the dividing wall, wherein the dividing wall extends further towards the impact wall in an axial direction than the air outlet opening, and wherein the dividing wall spans the entire surface of the air outlet opening, viewed in a radial direction. Through this dividing wall, a labyrinth is formed in the region of the air outlet opening which leads to a further separation of the oil from the aerosol. Moreover, the aerosol is in addition prevented from being centrifuged straight from the impeller to the air outlet opening.

According to a further exemplary embodiment of the invention, the impact wall is an internal wall of the housing.

According to a further exemplary embodiment of the invention, the oil separator has, in addition, at least one oil outlet opening which is arranged in the installation position provided for in a weight-force-facing half of the housing.

According to a further exemplary embodiment of the invention, it further exhibits an engagement element for driving the impeller which is located on the rotational axis and projects from the housing. This engagement element is adapted to be coupled straight to the camshaft of the internal combustion engine.

According to a further exemplary embodiment of the invention, the intake opening surrounds the engagement element. This arrangement of intake opening and engagement element supports the straight-line arrangement and the straight-line aerosol flow generation associated therewith.

Moreover, the invention relates to an internal combustion engine having a crankcase and an oil separator according to one of the preceding exemplary embodiments, the intake whereof opens out into an interior of the crankcase, wherein the impeller is coupled to a camshaft of the internal combustion engine and can be driven by said camshaft.

In addition, the invention relates to a motor vehicle having an internal combustion engine of this kind.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
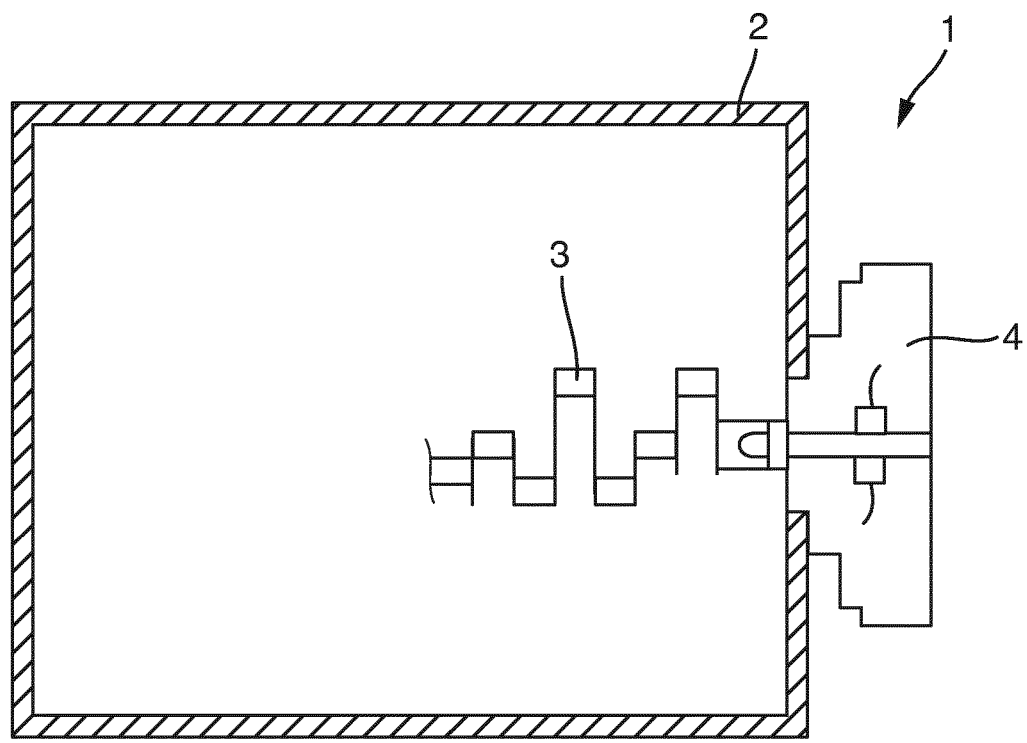
FIG. 1 is a schematic diagram of an internal combustion engine with the oil separator according to an embodiment of the invention.

FIG. 1 shows schematically an internal combustion engine 1 for a motor vehicle. The internal combustion engine 1 has a crankcase 2 and a crankshaft 3 to which an exemplary oil separator 4 according to the invention can be coupled.

Figure 2:
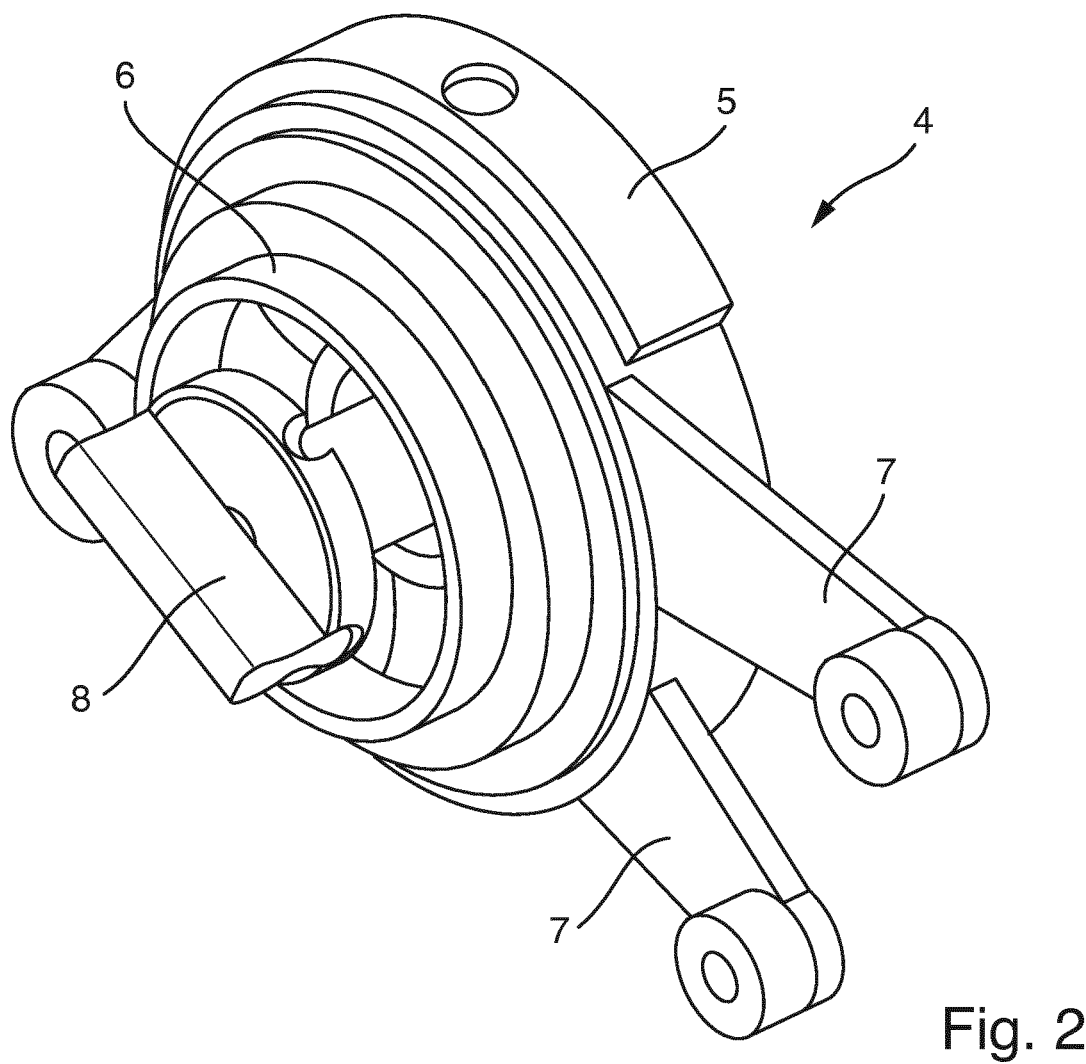
FIG. 2 is a three-dimensional view of the oil separator.

FIG. 2 shows a three-dimensional view of the oil separator 4. The oil separator 4 has a housing 5 with a flange portion 6 that can be inserted into the crankcase 2 and also fastening arms 7 with which the housing 5 can be fastened to the crankcase 2. The oil separator 4 can be coupled to the crankshaft 3 via an engagement element 8 and driven by said crankshaft.

Figure 3:
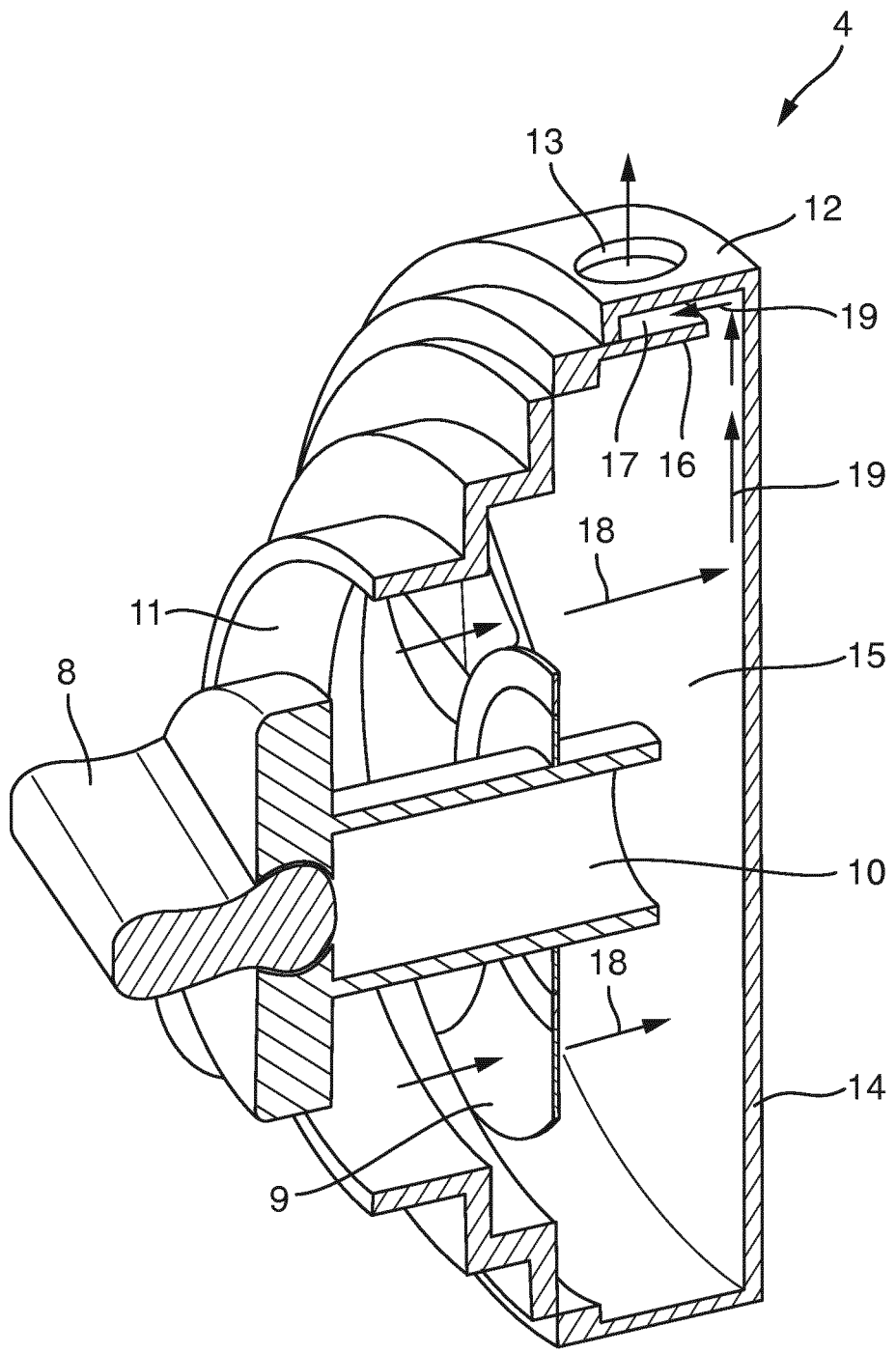
FIG. 3 is a three-dimensional sectional view of the oil separator.

FIG. 3 shows a three-dimensional sectional representation of the oil separator 4 from FIG. 2, wherein FIG. 3 is a sectional representation along a rotational axis of an impeller 9. This impeller 9 is an axial impeller, i.e. during rotation about its rotational axis, the impeller 9 produces a flow parallel to its rotational axis. The impeller 9 is mounted on a shaft 10 and connected thereto in a non-rotatable manner. The shaft 10 is in turn rotatably connected to the housing 5 and mounted rotatably in respect of said housing 5. The impeller 9 comprises a main body fastened to the shaft 10, on the radially outward side whereof a plurality of vanes is arranged.

The impeller 9 is completely arranged in the housing 5 which has a round intake opening 11 at its end on the crankcase side, extends incrementally from said intake opening away from the end on the crankcase side and with an incrementally enlarged diameter to its outer surface 12 with the largest outer diameter which is provided with an air outlet opening 13. The oil separator 4 has a predefined installation position in respect of the crankcase 2, wherein it is advantageous for the air outlet opening 13 to be arranged at a point on the outer surface 12 which, in this predefined installation position, is as far as possible from a weight-force-facing side of the oil separator 4. On the side opposite the intake opening, the housing 5 is provided with a rear wall 14 which preferably takes the shape of a round, planar plate and directly attaches to the outer surface 12.

At the end on the crankcase side, the shaft 10 is provided with the engagement element 8, so that the shaft 10, and with it the impeller 9, can be driven in a rotating manner via the engagement element 8 that can be coupled to the crankshaft 3. The engagement element 8 in the illustrated case takes the shape of a plate with an engagement projection running transversely on the crankcase side. However, the engagement element 8 may also take the form of any other meshing coupling mechanism.

The engagement element 8 is arranged in the region of the intake opening 11, radially within said opening, so that an intake cross-sectional surface that is available for the inward flow into the housing 5 is made smaller and exhibits the shape of a circular ring. An axial projection of the vanes of the impeller 9, i.e. an imaginary projection of the vanes along lines that extend parallel to the rotational axis, extends substantially through the intake cross-sectional surface. In this way, a straight-line, axial inward flow of aerosol from the crankcase is ensured. During running, the impeller accelerates the incoming aerosol in a straight line and centrifuges the aerosol against the inside of the rear wall 14 which acts as an impact wall 15. This aerosol flow is depicted by the arrows 18 in FIG. 3. When aerosol particles impinge on the impact wall 15 oil is separated from the aerosol, so that the aerosol is substantially divided up into air and oil. It will of course be clear to the person skilled in the art that this will not be a perfect 100% division. The separated oil fraction can run down the impact wall 15 on account of the weight force and be guided back again out of an oil outlet opening (not shown) into the crankcase 2. The oil outlet opening in this case is arranged in the planned installation position as close as possible to the weight-force-facing side of the oil separator 4.

The air remaining following separation of the oil fraction is removed from the oil separator via the air outlet opening 13, as is depicted by the arrows 19 in FIG. 3. This air can be fed back to the combustion chambers.

A dividing wall 16 is configured radially within the air outlet opening 13, so that a gap 17 is formed between the air outlet opening 13 and the dividing wall 16, wherein the dividing wall 16 extends further to the impact wall 15 in an axial direction than the air outlet opening 13, and wherein the dividing wall 16 covers the entire surface of the air outlet opening 13, viewed in a radial direction.

While the invention has been illustrated and described in detail in the drawings and the preceding description, this illustration and description should be understood as illustrative or exemplary and not as limiting and it is not intended that the invention should be limited to the disclosed exemplary embodiments. The mere fact that particular features are referred to in different dependent claims should not imply that a combination of these features could not also be advantageously used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An oil separator for separating oil from aerosol in an internal combustion engine, comprising:
- a housing defining a flange portion configured to be inserted into and received within an opening in a wall of a crankcase of the engine and surrounding an intake opening for the aerosol;
- a drivable impeller rotating about a rotational axis, which impeller is adapted to generate an aerosol flow along an axial direction of the impeller, and is arranged in the housing;
- a dividing wall disposed radially outside of the drivable impeller and radially within an air outlet opening in the housing, the dividing wall forming a labyrinth separating the oil from the aerosol; and
- an impact wall which is configured such that a projection of the impeller directed axially and downstream in the aerosol flow impinges on the impact wall, wherein at least part of a projection of the impeller directed axially and upstream in the aerosol flow impinges on the intake opening.

2. The oil separator as claimed in claim 1, wherein the air outlet opening is arranged in a planned installation position of the oil separator in a weight-force-averted half of the housing.

3. The oil separator as claimed in claim 2, wherein at least one oil outlet opening is arranged, in the planned installation position, in a weight-force-facing half of the housing.

4. The oil separator as claimed in claim 1, wherein the dividing wall is configured so that a gap is formed between the air outlet opening and the dividing wall, the dividing wall extends further towards the impact wall in an axial direction than the air outlet opening, and the dividing wall spans the entire surface of the air outlet opening, viewed in a radial direction.

5. The oil separator as claimed in claim 1, wherein the impact wall is an internal wall of the housing.

6. The oil separator as claimed in claim 1, further comprising:
   an engagement element for driving the impeller which is located on the rotational axis and projects from the housing.

7. The oil separator as claimed in claim 6, wherein the intake opening surrounds the engagement element.

8. An internal combustion engine, comprising:
   a crankcase; and
   an oil separator as claimed in claim 1, wherein the intake opening thereof opens out into an interior of the crankcase, and
   wherein the impeller is coupled to a camshaft of the internal combustion engine and is driven by said camshaft.

9. A motor vehicle, comprising an internal combustion engine as claimed in claim 8.

* * * * *